United States Patent [19]

Thompson

[11] Patent Number: 4,505,682
[45] Date of Patent: Mar. 19, 1985

[54] LEARNING AID WITH MATCH AND COMPARE MODE OF OPERATION

[75] Inventor: Barbara J. Thompson, Lubbock, Tex.

[73] Assignee: Texas Instruments Incorporated, Dallas, Tex.

[21] Appl. No.: 382,006

[22] Filed: May 25, 1982

[51] Int. Cl.³ .............................................. G09B 5/06
[52] U.S. Cl. ................................... 434/335; 434/169; 434/176; 434/201; 434/205; 381/52
[58] Field of Search .................... 434/335, 338-341, 434/205, 319-321, 156, 157, 169, 176, 201; 179/1 SM, 1 SP; 381/51, 52

[56] References Cited

U.S. PATENT DOCUMENTS

| | | | |
|---|---|---|---|
| 3,763,574 | 10/1973 | Rose | 434/339 |
| 3,771,240 | 11/1973 | Matui | 434/339 |
| 4,337,375 | 6/1982 | Freeman | 434/313 |
| 4,406,626 | 9/1983 | Anderson et al. | 434/169 |

Primary Examiner—Richard C. Pinkham
Assistant Examiner—Leo P. Picard
Attorney, Agent, or Firm—Robert D. Marshall, Jr.; Leo N. Heiting; Melvin Sharp

[57] ABSTRACT

An electronic learning aid selectively provides synthetic speech to an operator. An electro-optic sensor which reads bar code from the pages of a book selects speech words or phrases to be produced by an electronic speech synthesizer. A mode of operation is provided wherein the operator selects an object of comparison such as a displayed picture, number or the like and then seeks to identify one of a plurality of choices which properly associates with the object of comparison.

10 Claims, 5 Drawing Figures

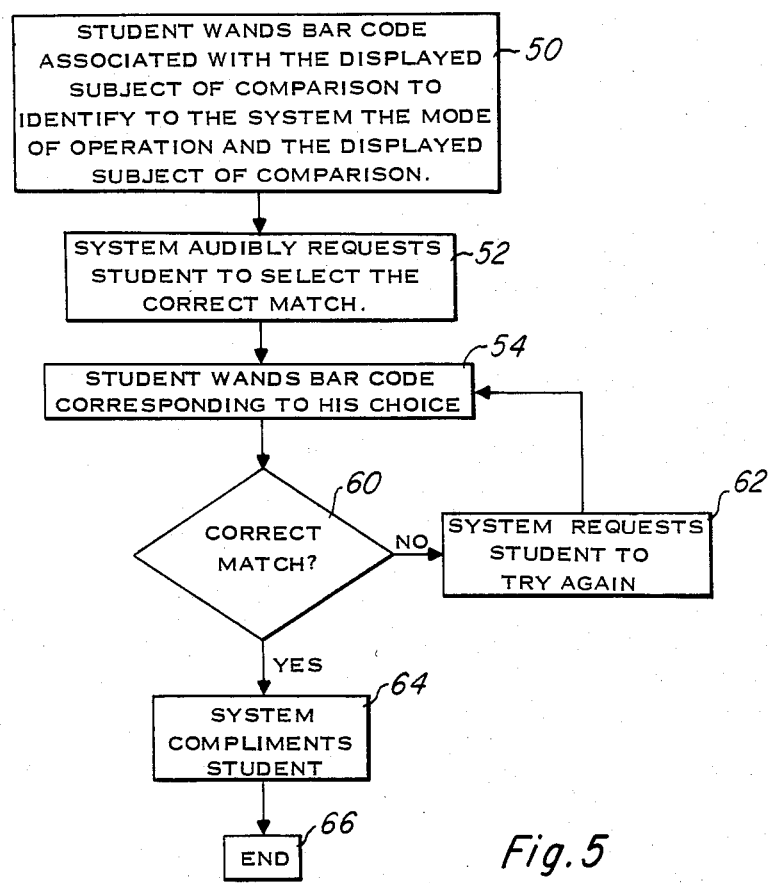

LEARNING AID WITH MATCH AND COMPARE MODE OF OPERATION

BACKGROUND OF THE INVENTION

This invention relates to electronic educational products and more specifically to speaking electronic educational products.

In recent years there have become available a number of electronic educational learning aid products, an early example of these being the Little Professor* mathematics learning aid. This product presents mathematical problems to an operator by means of a visual display and the operator enters attempted solutions to the problem via a keyboard. The product then indicates to the operator the correctness of his response. In addition there has appeared a series of learning aids which have the additional capability of communicating to the operator by means of electronically synthesized speech. Examples of these include the Speak & Spell*, Speak & Math*, and Speak & Read* electronic learning aids (*trademark of Texas Instruments Incorporated).

More recently there has been disclosed in Freeman U.S. Pat. No. 4,337,375 entitled "Manually Controllable Data Reading Apparatus for Speech Synthesizers" issued June 29, 1982, a new type of system which has the capability of communicating to the operator by means of electronically synthesized speech. This system is distinguished by the fact that the words that are to be spoken are identified to the system by the operator through the use of an optical code reading instrument. The code, which may comprise a bar code of the type that has been used by grocers on certain of their products, may typically appear on the pages of a book below a line of corresponding printed text. Thus, an operator, who may typically be a child seeking to gain reading facility, when he encounters words or phrases that he does not recognize, may pass the optical reading instrument over the corresponding coded material thereby causing the system to speak the word or phrase. It will be seen therefore that such a system comprises a powerful learning aid in that it will selectively provide for the student verbalization of those words and phrases which he does not recognize in the printed text. It will be appreciated that a learning aid with such capability may have application to students of a wide variety of ages including preschool students.

A problem, particularly with students of younger ages, is to provide systems which will not only be effective in imparting the educational content, but which will also provide an enjoyable experience so as to maintain the interest of the student. In accordance with this invention, there is provided a code reading speaking learning aid of the type described above which has a mode of operation so as to provide the student with variety and stimulation in the educational experience.

SUMMARY OF THE INVENTION

More specifically in accordance with the practice of this invention, there is provided a code reading speaking learning aid wherein the student begins the exercise by passing the wand over bar code associated with a displayed number. The student follows this by passing the wand over bar code associated with any of a plurality of displays each having a different number of displayed objects. The goal is for the student by passing the wand over one of a plurality of car codes to select the display having the number of objects corresponding to the displayed number. If he selects the appropriate display he is rewarded with complimentary comments. If he selects the wrong display he is encouraged and requested to try again.

In an alternative embodiment of the invention, the student begins by passing the wand over bar code associated with a picture of an object. The student then passes the wand over one of a plurality of bar codes each associated with the name of a particular object one of which is the name of the displayed object. Again in the event of a correct choice the student is rewarded with a complimentary comment, while in the event of a wrong choice he is encouraged to try again.

It is therefore an object of the invention to provide an electronic learning aid of the general type described and having the capacity to provide challenging and interesting learning exercises to a student operator.

It is aother object of the invention to provide a learning aid of the general type described wherein the student operator is required to select the correct one of a plurality of pictures each picture depicting a differing number of objects therein, and where the correct picture corresponds to a displayed number.

It is a further object of the invention to provide a learning aid of the general type described wherein the student operator is required to select the appropriate one of a plurality of object names wherein the appropriate one is the name of a displayed object.

The novel features believed characteristic of the invention are set forth in the appended claims. The invention itself, however, as well as other features and advantages thereof, will be best understood by reference to the detailed description which follows, read in conjunction with the accompanying drawings, wherein:

BRIEF DESCRIPTION OF THE DRAWINGS

FIG. 5 is a flow chart showing the sequence of operation provided by the present invention.

DETAILED DESCRIPTION

Figure 1:
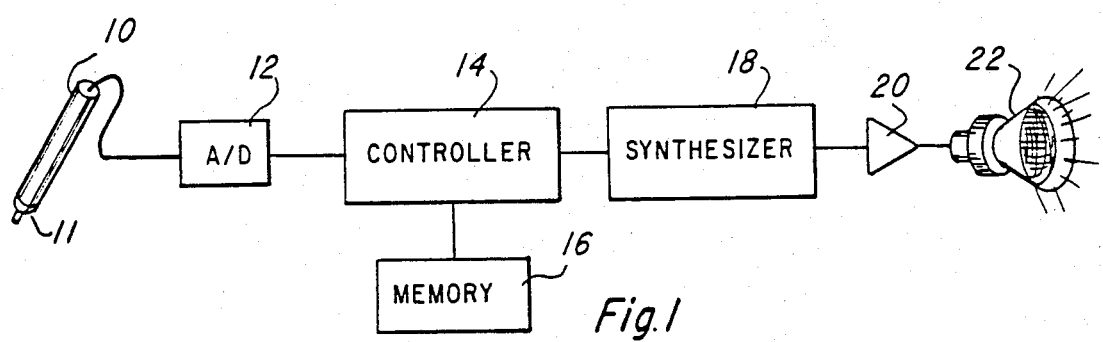
FIG. 1 is a block diagram of the code reading speaking learning aid comprising the present invention.

With reference to FIG. 1 there is shown a block diagram of the claimed system. The input to the system comprises an electro-optical wand 10 which is used to scan and detect bar code located on the medium to be read. Illumination of the bar code, typically by means of infra-red energy, and sensing of the energy reflected from the bar code is accomplished by means of a head 11. Such electro-optical wands are well known in the art and typically comprise means for generating the illuminating energy, as well as means for detecting and converting the reflections from the bar code to electrical energy. A particularly convenient mechanism for transmitting the illuminating energy and the reflected energy is that disclosed in copending U.S. patent application Ser. No. 308,346, filed 10/5/81 and assigned to the assignee of the present invention. In the preferred embodiment of the invention the bar code to be read by the wand will have one of two colors, black or white, although in other embodiments it may be preferrable to use multicolor bar code. In the case of two color bar code the electrical signal output by wand 10 is analog in nature, but basically has two discrete levels corresponding to the two colors comprising the bar code.

The output of the scanning wand 10 is digitized in analog to digital converter 12. Functionally, A/D converter 12 amounts to an overdriven amplifier which serves to square up the analog waveform from wand 10 so that the output of A/D converter 12 is a well defined digital signal having one of two discrete levels.

The output of A/D converter 12 is coupled to an input of controller 14, which in the preferred embodiment comprises a model TMS 7040 8-bit microcomputer available from Texas Instruments Incorporated. Controller 14 utilizes information derived from the bar code by wand 10 to control the operation of the system as claimed.

To accomplish spoken or other auditory communication to the user of the system, controller 14 in the preferred embodiment provides digital auditory information to synthesizer 18 which may comprise a model TMS 5220A voice synthesis processor also available from Texas Instruments Incorporated. Synthesizer 18 utilizes the digital input information to synthesize an analog sound waveform which is in turn provided to amplifier 20. Amplifier 20 in turn provides the analog signal at a suitable level to speaker 22 for generation of the audible information.

In the preferred embodiment, at least some of the digital data used by synthesizer 18 is stored in the form of allophones. As is well known by those skilled in the art, allophones are basic units of speech which may be combined in suitable sequences so as to provide the sounds, words, phrases and the like that are useful in human communication. The digital data which is used by synthesizer 18 to synthesize the individual allophone sounds are stored in memory 16 which in the preferred embodiment comprises a read only memory (ROM).

Figure 2:
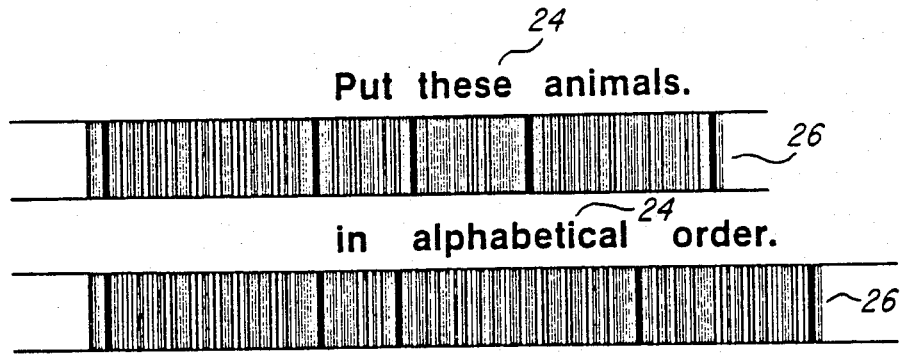
FIG. 2 illustrates typical bar code input information in association with alphanumeric data.

Various types of information are available from the bar code located on the printed medium such as a page of a book. An example of a portion of such a page is illustrated in FIG. 2. When the wand is passed over the bar code 26 the system will enunciate the phrase comprised of the words 24. The portion of the bar code underlying each of these individual words serves to identify the sequence of allophones that is required in each case to produce the corresponding word. It will be noted however that the two lines of bar code illustrated each has a considerable portion to the left of the area in which the words of the phrase appear. This additional bar code serves in part to provide prosody information for the corresponding phrase. Such prosody information serves to indicate a desired pitch variation and duration for the individual allophones. In the absence of such prosody information the sequence of allophones when assembled would result in relatively monotonic speech. With the use of the prosody information, the speech is produced in a more familiar and pleasing fashion.

Further, the bar code located to the left of the region where the words appear also provides information about the nature of the activity. The system illustrated in FIG. 1 has various modes of operation, each of which is initiated by information derived from the pages of the book itself. This mode information which may be derived from the left portions of the bar code 26 illustrated in FIG. 2 is utilized by controller 14 to direct appropriate functioning of the system. Thus in the example of FIG. 2, when the operator passes the wand over the bar code the system utilizes the prosody and allophone identification data in the bar code to access the digital information for the appropriate allophones from ROM 16, and to modify this data in accordance with the prosody information before passing the digital signals to synthesizer 18 for sound synthesis. In addition the bar code has informed controller 14 to place itself in a mode wherein the operator is required to identify a plurality of characters in an alphabetical order. As will be subsequently described, other modes of operation are possible.

The acquisition of prosody and allophone identification from scanned bar code is disclosed in U.S. patent application Nos. 381,986 and 381,987 filed the same date as the present application, also assigned to the assignee of the present invention.

Figure 3:
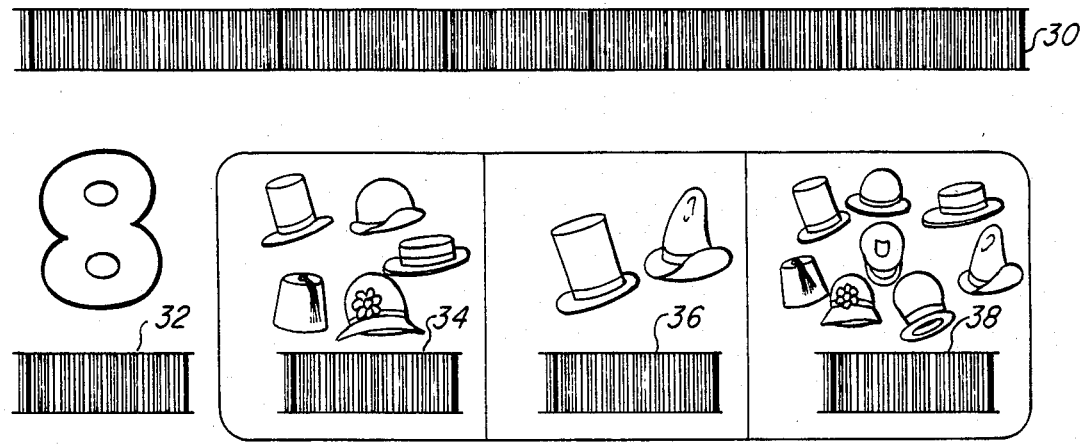
FIG. 3 illustrates a first embodiment of the match/compare mode of the present invention.

FIG. 3 illustrates numerical example of the match and compare mode of the present invention. Controller 14, in response to wanding of bar code 30, causes the phrase "Which picture matches the numeral?" to be enunciated. The student then wands bar code 32 underlying the displayed number "8". Bar code 32 informs controller 14 that the machine is to operate in the match and compare mode, and causes the system to enunciate the number 8. At at the same time the bar code has informed controller 14 that the number for comparison is the number 8. Finally the student wands one of bar codes 34, 36, or 38. If the student has wanded bar code 38, controller 14 recognizes that a correct match has been achieved and rewards the student with a comment "8, that is correct". Alternatively, if the student has wanded bar code 34 for example, the system responds with a comment "That is incorrect, please try again".

Figure 4:
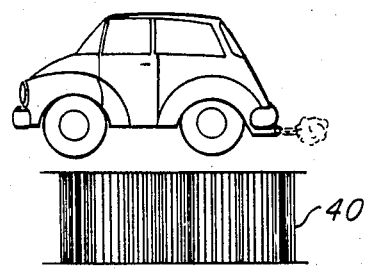
FIG. 4 shows a second embodiment of the match/compare mode of the present invention.
Figure 4:
Figure 4:
Figure 4:

In FIG. 4 there is illustrated a second example of the match and compare mode of the invention. In this case the student begins by wanding bar code 40 which causes the system to advise the student to find the word for car and provides the microcontroller 14 with the information that car is the correct match. If the student then wands bar code 44, the system responds with the comment "Car, that is correct". Alternatively, if the student wands bar code 42, the system responds with the comment "That is incorrect, please try again".

A flow diagram illustrating the steps implemented by the system of the present invention is illustrated in FIG. 5. Operation begins at step 50 where a student wands the bar code that is associated on the book page with the displayed object that he wishes to use as a subject of comparison. The wanding of this bar code identifies to the system the fact that the match and compare mode is to be used and further identifies the specific subject of comparison. In response to this input, the system at step 52 audibly requests the student to select the correct match to the subject of comparison. At step 54 the student selects one of a plurality of possible answers and wands the corresponding bar code. The machine at step 60 performs the comparison between the subject of comparison and the students chosen answer. If an incorrect match occurs the system then at step 62 requests the student to try again and loops back to step 54. Alternatively, if a correct match has occurred the system at 64 compliments the student and the operation ends at step 66 where the system then enters a wait state. A student may thereafter initiate another match and compare operation or any of the other modes of operation available with the system.

What is claimed is:

1. An interactive learning apparatus comprising:
    (a) scanning means for reading student selected coded indicia from a medium, said coded indicia including a first coded indicia associated with a first displayed object and a plurality of second coded indicia, each second coded indicia associated with a second displayed object one of said second displayed objects having a desired relationship to the corresponding first displayed object;
    (b) initialization means connected to said scanning means responsive to reading first coded indicia for entering a match mode, selecting prompting output data and identifying said second coded indicia associated with said second displayed object having the desired relationship to said first displayed object;
    (c) comparison means connected to said scanning means responsive to reading a selected second coded indicia for selecting first comparison output data if said second coded indicia is said identified second coded indicia and for selecting second comparison output data if said selected second coded indicia is not said identified second coded indicia; and
    (d) output means connected to said initialization means and said comparison means for generating a student perceivable output corresponding to said selected output data.

2. The learning apparatus of claim 1 wherein said first and second coded indicia comprise bar codes.

3. The learning apparatus of claim 1, wherein:
    said prompting output data selected by said initialization means and said first and second comparison output data selected by said comparison means comprises speech synthesis data; and
    said output means comprises a speech synthesis means for generating one or more words of human language corresponding to said selected speech synthesis data.

4. The learning apparatus of claim 3, wherein:
    said first comparison output data corresponds to a praise phrase; and
    said second comparison output data corresponds to a retry phrase.

5. Apparatus for aiding a student comrising:
    (a) scanning means for reading student selected coded indicia from a medium, said coded indicia including first coded indicia associated with a pictured object and a plurality of second coded indicia, each of said second coded indicia associated with the name of an object at least one of which is the name of said pictured object;
    (b) initialization means connected to said scanning means responsive to reading first coded indicia for entering a match mode, selecting a prompting output data and identifying said second coded indicia associated with the name of said pictured object associated with said selected first coded indicia;
    (c) comparison means connected to said scanning means responsive to reading a selected second coded indicia for selecting first comparison output data if said selected second coded indicia is said identified second coded indicia and for selecting second comparison output data if said selected second coded indicia is not said identified second coded indicia; and
    (d) output means connected to said initialization means and said comparison means for generating a student perceivable output corresponding to said selected output data.

6. The apparatus of claim 5 wherein said first and second coded indicia comprise bar code data.

7. The learning apparatus of claim 5, wherein:
    said prompting output data selected by said initialization means and said first and second comparison output data selected by said comparison means comprises speech synthesis data; and
    said output means comprises a speech synthesis means for generating one or more words of human language corresponding to said selected speech synthesis data.

8. Apparatus for aiding a student comprising:
    (a) scanning means for reading student selected coded indicia from a medium, said coded indicia including a first coded indicia associated with a pictured number and a plurality of second coded indicia, each second coded indicia associated with a picture of a plurality of objects the number of one of which is the same as said pictured number;
    (b) initialization means connected to said scanning means responsive to reading first coded indicia for entering a match mode, selecting prompting output data and identifying said second coded indicia associated with said plurality of objects equal to said pictured number;
    (c) comparison means connected to said scanning means responsive to reading a selected second coded indicia for selecting first comparison output data if said second coded indicia is said identified second coded indicia and for selecting second comparison output data if said second coded indicia is not said identified second coded indicia; and
    (d) output means connected to said initialization means and said comparison means for generating a student perceivable output corresponding to said selected output data.

9. The apparatus of claim 8 wherein said first and second coded indicia comprise bar code data.

10. The learning apparatus of claim 8, wherein:
    said first comparison output data corresponds to a praise phrase; and
    said second comparison output data corresponds to a retry phrase.

* * * * *